(12) United States Patent
Drissi

(10) Patent No.: US 12,064,715 B1
(45) Date of Patent: Aug. 20, 2024

(54) METHOD OF ON SITE OIL RECYCLING

(71) Applicant: Djalloul Drissi, Montreal (CA)

(72) Inventor: Djalloul Drissi, Montreal (CA)

( * ) Notice: Subject to any disclaimer, the term of this patent is extended or adjusted under 35 U.S.C. 154(b) by 0 days.

(21) Appl. No.: 18/527,257

(22) Filed: Dec. 2, 2023

(51) Int. Cl.
*B01D 21/26* (2006.01)
*B01D 36/04* (2006.01)

(52) U.S. Cl.
CPC ......... *B01D 21/262* (2013.01); *B01D 36/045* (2013.01); *B01D 2239/1216* (2013.01)

(58) Field of Classification Search
CPC ............... B01D 21/262; B01D 36/045; B01D 2239/1216
See application file for complete search history.

(56) References Cited

U.S. PATENT DOCUMENTS 5,089,139 A * 2/1992 Asbeck ................... C11B 3/008
426/601
2019/0010405 A1* 1/2019 Moore ...................... C10L 1/14

FOREIGN PATENT DOCUMENTS

CN 215539078 U * 1/2022

OTHER PUBLICATIONS

Zou, J. et al—CN 215539078 U FIT translation and original doc—Jan. 18, 2022 (Year: 2022).*

* cited by examiner

*Primary Examiner* — Bradley R Spies
(74) *Attorney, Agent, or Firm* — Edward P Dutiewicz

(57) ABSTRACT

Used oil passes through a centrifuge tank for particulate separation. The oil then passes through an inlet control valve into an oil passageway. The oil passageway transfers the oil, by way of an oil pump, to a second tank and then through a five micron oil filter, through a one micron oil filter, through a two hundred and twenty nanometer oil filter, and through a one micron filter, under six BARS of pressure. There is an outlet valve which received filtered oil from the one hundred nanometer filter.

2 Claims, 3 Drawing Sheets

METHOD OF ON SITE OIL RECYCLING

BACKGROUND OF THE INVENTION

Rule 1.78 (F)(1) Disclosure

The Applicant has not submitted a related pending or patented non-provisional application within two months of the filing date of this present application. The invention is made by a single inventor, so there are no other inventors to be disclosed. This application is not under assignment to any other person or entity at this time.

There are no cross referenced or related applications which are direct to, or related to, the present application.

There is no research of development of this application which is federally sponsored.

FIELD OF THE INVENTION

The present invention relates to a Method of On Site Oil Recycling and more particularly pertains to a method for recycling oil.

DESCRIPTION OF THE PRIOR ART

The use of oil recycling is known in the prior art. More specifically, oil recycling previously devised and utilized for the purpose of converting used oil into reusable oil are known to consist basically of familiar, expected, and obvious structural configurations, notwithstanding the number of designs encompassed by the prior art which has been developed for the fulfillment of countless objectives and requirements.

While the prior art devices fulfill their respective, particular objectives and requirements, the prior art does not describe Method of On Site Oil Recycling that teaches an oil recycling device, which can be used at individual locations, such as auto repair centers.

In this respect, the Method of On Site Oil Recycling, according to the present invention, substantially departs from the conventional concepts and designs of the prior art, and in doing so provides an apparatus primarily developed for the purpose of providing a method for recycling oil.

Therefore, it can be appreciated that there exists a continuing need for a new and improved Method of On Site Oil Recycling which can be used as a method for recycling oil. In this regard, the present invention substantially fulfills this need.

SUMMARY OF THE INVENTION

In view of the foregoing disadvantages inherent in the known types of oil recycling now present in the prior art, the present invention provides an improved Method of On Site Oil Recycling. As such, the general purpose of the present invention, which will be described subsequently in greater detail, is to provide a new and improved Method of On Site Oil Recycling and method which has all the advantages of the prior art and none of the disadvantages.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

In describing aspects of the invention, the word "generally" may be used. The term, "generally" when used to describe a configuration means that the configuration includes those aspects which are within normal manufacturing parameters of acceptance. By way of example, the term "generally round" may be used. This should be interpreted to mean that the configuration may be perfectly round, but may also have a radius which is not exact, but is within the manufacturing parameters. For example, a basketball may be generally round, but not be perfectly round.

By adjacent to a structure is meant that the location is near the identified structure.

To attain the herein stated goals, the present invention essentially comprises a method for on-site oil recycling comprising several steps.

First provided is a volume of used oil. The oil is then placed in a centrifuge tank wherein the oil is spun to remove large particles and sediment from the oil. The centrifuge tank is coupled to an oil passageway. The oil passageway is a conduit or pipe, sufficient to transfer oil from one location to another.

The method uses a system inlet control valve within the oil passageway for controlling the flow of oil through the filtering system.

The method uses an oil transfer pump having an oil passageway inlet and an oil passageway outlet. The oil transfer pump receives the volume of oil through the oil passageway. The oil transfer pump oil passageway outlet has a pressure gauge to monitor pressure within the oil passageway. The oil is transferred from the oil transfer pump to a second tank through the oil passageway.

The second tank has an oil passageway inlet and an oil passageway outlet. The second tank has a pressure relief valve for allowing overpressurized oil to be transferred back to the oil passageway inlet of the oil transfer pump.

A five micron oil filter has an oil passageway inlet and an oil passageway outlet. The oil passageway outlet of the second tank provides the volume of oil to the five micron oil filter oil passageway inlet. The volume of oil passes, under pressure, through the five micron oil filter from the oil passageway inlet. The volume of oil passes through the five micron filter and out of the five micron filter through the oil passageway outlet of the five micron filter.

A one micron oil filter has an oil passageway inlet and an oil passageway outlet. The oil passageway outlet of the five micron filter provides the volume of oil to the oil passageway inlet of the one micron oil filter. The volume of oil passes, under pressure, through the one micron oil filter from the oil passageway inlet, through the one micron filter and out of the one micron filter through the oil passageway outlet of the one micron filter.

A two hundred and twenty nanometer oil filter has an oil passageway inlet and an oil passageway outlet. The oil passageway outlet of the one micron filter provides the volume of oil to the two hundred and twenty nanometer oil filter oil passageway inlet. The volume of oil passes, under pressure, through the two hundred and twenty nanometer oil filter from the oil passageway inlet, through the two hundred and twenty nanometer oil filter, and out of the two hundred and twenty nanometer oil filter through the oil passageway outlet of the two hundred and twenty nanometer oil filter.

A one hundred nanometer oil filter has an oil passageway inlet and an oil passageway outlet. The oil passageway outlet of the two hundred and twenty nanometer filter provides the volume of oil to the one hundred nanometer oil filter oil passageway inlet. The volume of oil passes through the one hundred nanometer oil filter from the oil passageway inlet, through the one hundred nanometer oil filter and out of the one hundred nanometer oil filter through the oil passageway outlet of the one hundred nanometer oil filter.

Lastly, the oil passageway has an outlet valve which is coupled to the outlet oil passageway of the one hundred nanometer filter.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved Method of On Site Oil Recycling which has all of the advantages of the prior art oil recycling and none of the disadvantages.

It is another object of the present invention to provide a new and improved Method of On Site Oil Recycling which may be easily and efficiently manufactured and marketed.

It is further object of the present invention to provide a new and improved Method of On Site Oil Recycling which is of durable and reliable constructions.

An even further object of the present invention is to provide a new and improved Method of On Site Oil Recycling which is susceptible of a low cost of manufacture with regard to both materials and labor, and which accordingly is then susceptible of low prices of sale to the consuming public, thereby making such Method of On Site Oil Recycling economically available to the buying public.

Even still another object of the present invention is to provide a Method of On Site Oil Recycling for use in individual locations, such as auto service centers.

Lastly, it is an object of the present invention to provide a new and improved oil recycling method, wherein used oil passes through a centrifuge tank for particulate separation. The oil then passes through an inlet control valve into an oil passageway. The oil passageway transfers the oil, by way of an oil pump, to a second tank and then through a five micron oil filter, through a one micron oil filter, through a two hundred and twenty nanometer oil filter, and through a one micron filter, under six BARS of pressure. There is an outlet valve which received filtered oil from the one hundred nanometer filter.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
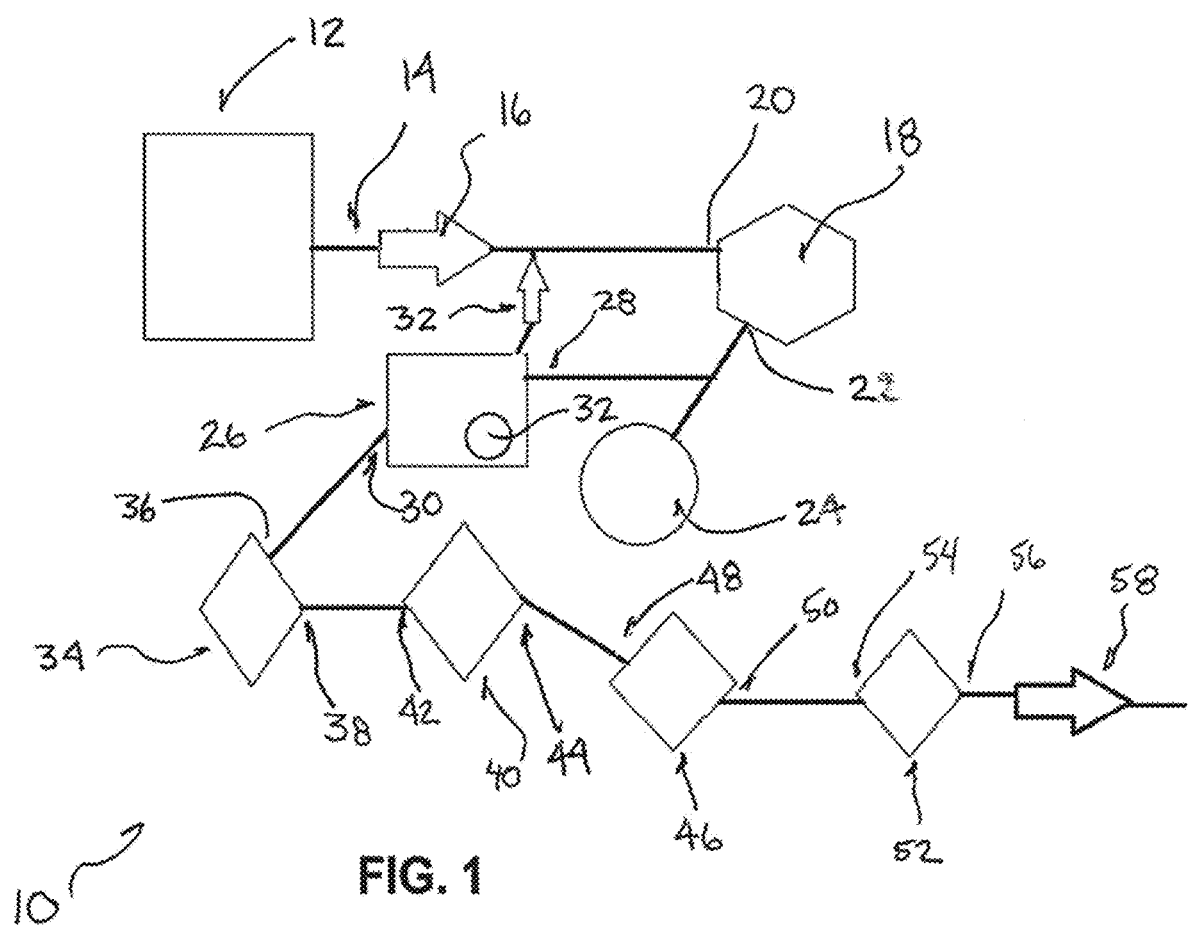
FIG. 1 is a flow chart of the method, showing the components which comprise the method.
Figure 2:
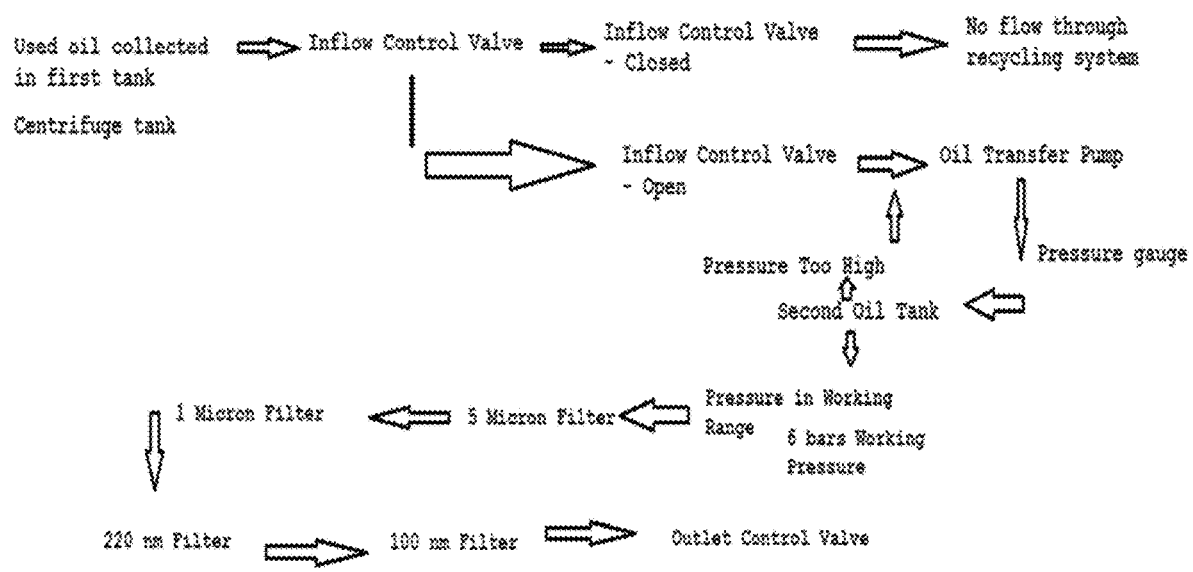
FIG. 2 is a word flow chart of the method showing the process method steps.
Figure 3:
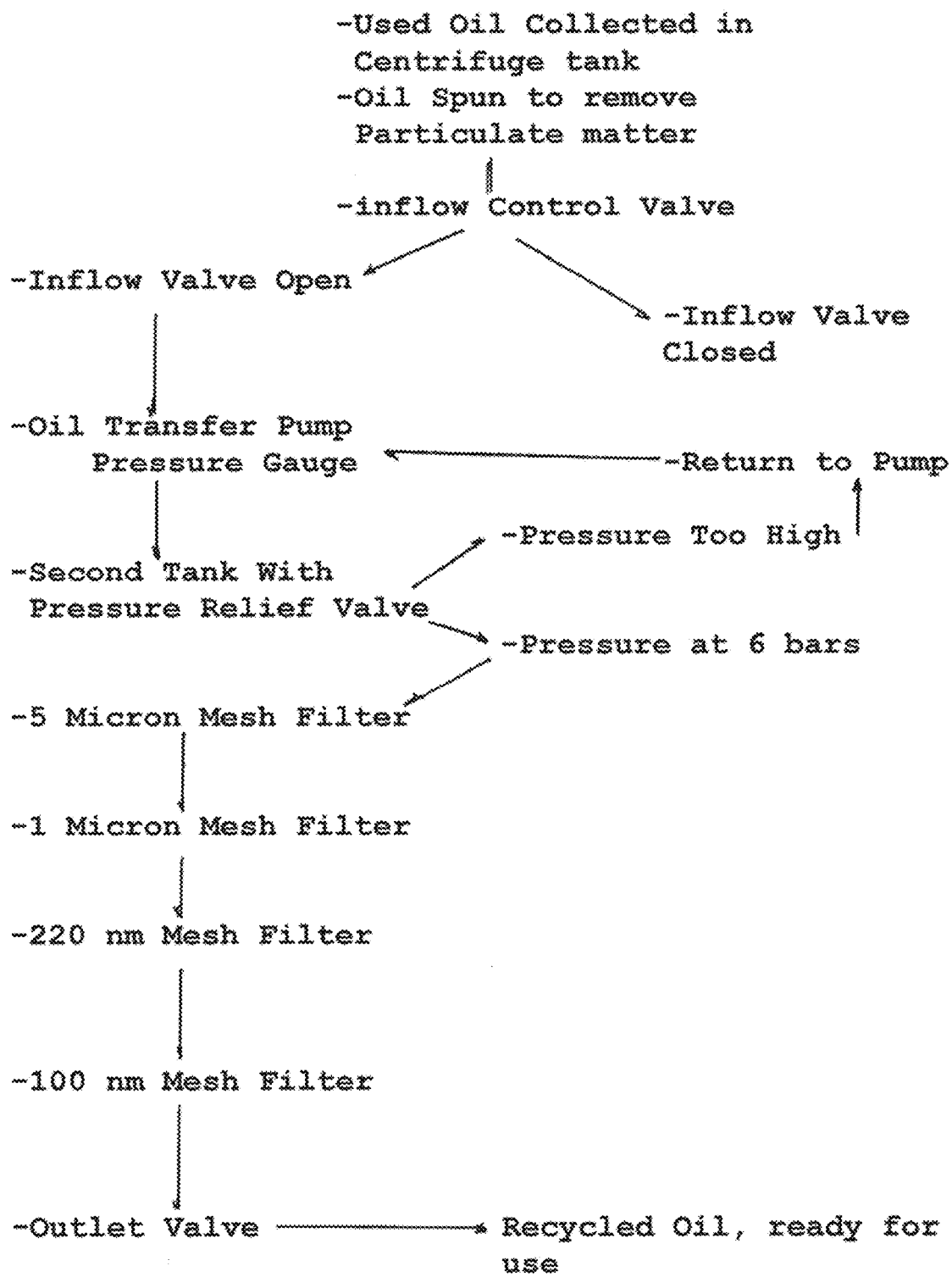
FIG. 3 is another process method word flow chart showing how the filtration method functions.

With reference now to the drawings, and in particular to FIG. 1 thereof, the preferred embodiment of the new and improved Method of On Site Oil Recycling embodying the principles and concepts of the present invention and generally designated by the reference numeral 10 will be described.

The present invention, the Method of On Site Oil Recycling 10, is comprised of a plurality of components. Such components in their broadest context include a centrifuge tank, a pressure pump, a series of filters and an outlet valve. Such components are individually configured and correlated with respect to each other so as to attain the desired objective.

A method for on-site oil recycling 10 comprises several steps.

First provided is a volume of used oil which is placed in a centrifuge tank 12. The tank is fabricated of 304 stainless steel. The oil is spun in the centrifuge tank to remove large particles and sediment from the oil. The centrifuge tank is coupled to an oil passageway 14. The oil passageway couples each of the elements of the method. The oil passageway is made of a rigid material. In the preferred embodiment, the oil passageway is made of 304 stainless steel. The oil passageway is a conduit or pipe, sufficient to transfer oil from one location to another.

The method uses a system inlet control valve 16 within the oil passageway for controlling the flow of oil through the filtering system. The inlet control valve is also made of 304 stainless steel.

The method uses an oil transfer pump 18 having an oil passageway inlet and an oil passageway outlet. The oil transfer pump utilizes a power supply of 230 volts at 60 hertz. The oil transfer pump has first inlet 20. The oil transfer pump receives the volume of oil through the first inlet oil passageway. The oil transfer pump oil passageway first outlet 22 has a pressure gauge 24 to monitor pressure within the first outlet oil passageway. The oil is transferred from the oil transfer pump to a second tank through the first outlet oil passageway.

The second tank 26 has a second oil passageway inlet 28 and a second oil passageway outlet 30. The second tank has a pressure relief valve 32 for allowing overpressurized oil to be transferred back to the first oil passageway inlet of the oil transfer pump. The second tank is made of stainless steel, and has an internal bladder. The second tank is used to hold, and return oil into the system in the event of overpressurization of the oil passageway. The second tank has pressure sensor 32 to report overpressurization of the oil passageway. The second tank utilizes a standard oil pressure gauge which is calibrated in atmospheric or barometric units. The oil passageway has a flow rate of five to ten liters per minute.

A five micron oil filter 34 has a third oil passageway inlet 36 and a third oil passageway outlet 38. The second oil passageway outlet of the second tank provides the volume of oil to the five micron oil filter third oil passageway inlet. The volume of oil passes, under pressure, through the five micron oil filter from the third oil passageway inlet. The volume of oil passes through the five micron filter and out of the five micron filter through the third oil passageway outlet of the five micron filter. The five micron oil filter is made of polypropylene strand, mesh, or a combination of the two. The five micron mesh filter is removable and cleanable. The working pressure of the five micron filter is six barometric units, or bars.

A one micron oil filter 40 has a fourth oil passageway inlet 42 and a fourth oil passageway outlet 44. The third oil passageway outlet of the five micron filter provides the volume of oil to the fourth oil passageway inlet of the one micron oil filter. The volume of oil passes, under pressure, through the one micron oil filter from the fourth oil passageway inlet, through the one micron filter and out of the one micron filter through the fourth oil passageway outlet of the one micron filter.

The one micron oil filter is made of polypropylene strand, mesh, or a combination of the two. The one micron mesh filter is removable and cleanable. The working pressure of the one micron filter is six barometric units, or bars.

A two hundred and twenty nanometer oil filter 46 has a fifth oil passageway inlet 48 and a fifth oil passageway outlet 50. The fourth oil passageway outlet of the one micron filter provides the volume of oil to the two hundred and twenty nanometer oil filter fifth oil passageway inlet. The volume of oil passes, under pressure, through the two hundred and twenty nanometer oil filter from the oil passageway inlet, through the two hundred and twenty nanometer oil filter, and out of the two hundred and twenty nanometer oil filter through the fifth oil passageway outlet of the two hundred and twenty nanometer oil filter.

The two hundred and twenty nanometer oil filter is made of polypropylene strand, mesh, or a combination of the two. The two hundred and twenty nanometer mesh filter is removable and cleanable. The working pressure of the two hundred and twenty nanometer filter is six barometric units, or bars.

A one hundred nanometer oil filter 52 has a sixth oil passageway inlet 54 and a sixth oil passageway outlet 56. The fifth oil passageway outlet of the two hundred and twenty nanometer filter provides the volume of oil to the one hundred nanometer oil filter sixth oil passageway inlet. The volume of oil passes through the one hundred nanometer oil filter from the sixth oil passageway inlet, through the one hundred nanometer oil filter and out of the one hundred nanometer oil filter through the sixth oil passageway outlet of the one hundred nanometer oil filter.

The one hundred nanometer oil filter is made of polypropylene strand, mesh, or a combination of the two. The one hundred nanometer mesh filter is removable and cleanable. The working pressure of the one hundred nanometer filter is six barometric units, or bars.

Lastly, the oil passageway has an outlet valve 58.

All filter elements are made of polypropylene strands and/or mesh. The filter elements are either replaceable or are removable and may be cleaned. Filter element cleaning may be done with solvent or any organic compound which will dilute oil, such as diesel fuel. Filter elements maybe soaked or washed and then rinsed with diesel fuel. The used diesel may then be separated from particles in suspension in the diesel by using an appropriate filter. The cleaned diesel may be again used to clean filters after particulate material has been removed from the diesel.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method for the process of on-site oil recycling comprising the following steps:
   providing a volume of used oil to be recycled;
   providing a centrifuge tank wherein the oil to be recycled is placed and then spun to remove large particles and sediment from the oil, the centrifuge tank being coupled to an oil passageway;
   providing an system inlet control valve within the oil passageway;
   providing an oil transfer pump having a first oil passageway inlet and a first oil passageway outlet, wherein the oil transfer pump receives the volume of oil to be recycled through the first oil passageway inlet, the oil transfer pump first oil passageway outlet having a pressure gauge, wherein the oil to be recycled is transferred to a second tank through the first oil passageway outlet;
   providing the second tank having a second oil passageway inlet and a second oil passageway outlet, the second tank receiving the oil to be recycled from the first oil passageway outlet of the oil transfer pump, the second tank having a pressure relief valve for allowing overpressurized oil to be transferred back to the first oil passageway inlet of the oil transfer pump;
   providing the second oil passageway outlet of the second tank providing the volume of oil to be recycled to a five micron oil filter, the five micron oil filter having a third oil passageway inlet and a third oil passageway outlet, the volume of oil to be recycled passing through the five micron oil filter from the third oil passageway inlet, through the five micron filter and out of the five micron filter through the third oil passageway outlet of the five micron filter;

providing the third oil passageway outlet of the five micron filter providing the volume of oil to a one micron oil filter, the one micron oil filter having a fourth oil passageway inlet and a fourth oil passageway outlet, the volume of oil to be recycled passing through the one micron oil filter from the fourth oil passageway inlet, through the one micron filter and out of the one micron filter through the fourth oil passageway outlet of the one micron filter;

providing the fourth oil passageway outlet of the one micron filter providing the volume of oil to be recycled to a two hundred and twenty nanometer oil filter, the two hundred and twenty nanometer oil filter having a fifth oil passageway inlet and a fifth oil passageway outlet, the volume of oil to be recycled passing through the two hundred and twenty nanometer oil filter from the fifth oil passageway inlet, through the two hundred and twenty nanometer oil filter and out of the two hundred and twenty nanometer oil filter through the fifth oil passageway outlet of the two hundred and twenty nanometer oil filter;

providing the fifth oil passageway outlet of the two hundred and twenty nanometer filter providing the oil to be recycled to a one hundred nanometer oil filter, the one hundred nanometer oil filter having a sixth oil passageway inlet and a sixth oil passageway outlet, the volume of oil to be recycled passing through the one hundred nanometer oil filter from the sixth oil passageway inlet, through the one hundred nanometer oil filter and out of the one hundred nanometer oil filter through the sixth oil passageway outlet of the one hundred nanometer oil filter;

providing an outlet valve coupled to the sixth oil passageway outlet of the one hundred nanometer oil filter; and the oil passageway coupling the first inlet oil passageway and the first outlet oil passageway to the second inlet oil passageway and the second outlet oil passageway to the third inlet oil passageway and the third outlet oil passageway to the fourth inlet oil passageway and the fourth outlet oil passageway to the fifth inlet oil passageway and the fifth outlet oil passageway to the sixth inlet oil passageway and the sixth outlet oil passageway to the outlet valve;

whereby oil is processed and cleansed of impurities, making it useable once again.

2. A method for constructing an on-site oil recycling system comprising the following steps:

providing a volume of used oil to be recycled;

providing an oil transfer pump coupled to an oil passageway, the oil passageway transferring oil to be recycled through the recycling system, the oil passageway coupling in sequence a five micron mesh oil filter and a one micron mesh oil filter and a two hundred and twenty nanometer mesh oil filter and a one hundred nanometer mesh oil filter;

providing the oil passageway transferring the volume of used oil to be recycled to the five micron mesh oil filter;

providing the oil passageway transferring the oil to be recycled from the five micron mesh filter to the one micron mesh filter;

providing the oil passageway transferring the oil to be recycled from the one micron mesh filter to the two hundred and twenty nanometer mesh oil filter;

providing the oil passageway transferring the oil to be recycled from the two hundred and twenty nanometer mesh oil filter to the one hundred nanometer mesh oil filter; and providing the oil passageway coupling an outlet valve to the one hundred nanometer oil filter.

\* \* \* \* \*